United States Patent [19]

Marazzi

[11] Patent Number: 5,062,682

[45] Date of Patent: Nov. 5, 1991

[54] CONNECTOR FOR AN OPTICAL FIBER

[75] Inventor: Silvio Marazzi, Cavigliano, Switzerland

[73] Assignee: Diamond S.A., Switzerland

[21] Appl. No.: 585,188

[22] Filed: Sep. 20, 1990

[30] Foreign Application Priority Data

Oct. 2, 1989 [CH] Switzerland .......................... 3575/89

[51] Int. Cl.$^5$ ................................................ G02B 6/36
[52] U.S. Cl. .......................................... 385/85; 385/78; 385/67
[58] Field of Search ............... 350/96.20, 96.21, 96.22, 350/96.23

[56] References Cited

U.S. PATENT DOCUMENTS

| 4,687,292 | 8/1987 | Krausse ........................ 350/96.20 X |
| 4,746,188 | 5/1988 | Löffler .............................. 350/96.20 |
| 4,763,980 | 8/1988 | Gerber et al. .................... 350/96.20 |
| 4,813,760 | 3/1989 | Tanaka et al. ............... 350/96.20 X |
| 4,887,881 | 12/1989 | Rütimann ........................ 350/96.20 |
| 4,978,193 | 12/1990 | Tomita ............................. 350/96.21 |

Primary Examiner—John D. Lee
Assistant Examiner—Phan T. Heartney
Attorney, Agent, or Firm—Shoemaker and Mattare

[57] ABSTRACT

The inclination (6) of the Fiber end surface (4) is arranged in such a way that an edge area (7), which extends through 360 degrees, remains around the inclination. The inclination is separated from the edge area by an annular shaped indentation. In this way the connector pin has on its face (5) a constantly unchanging limit-stop surface in each desired relative position.

8 Claims, 2 Drawing Sheets

CONNECTOR FOR AN OPTICAL FIBER

BACKGROUND OF THE INVENTION

The invention concerns a connector for an optical fibre according to the preamble of claim 1. With optical plug-in connectors, a Fresnel reflection occurs on the fibre end surfaces of the optical fibres to be connected to one another, whereby a return of light into the transmitting fibre can be the result. This light, which is reflected back into the transmitter, adversely effects the quality of the transmission system and is therefore most undesireable. For this reason the fibre end surface is inclined, in order to achieve a return loss which is as high as possible. The reflected light beams are in this way only transmitted back to a slight extent, whilst the higher proportion are radiated away to the outside of the optical fibre. The theoretical basis for calculation of the largest possible return loss is known to the expert.

With a few known connectors, the face is inclined flat through grinding in such a way that the fibre end surface, even with the largest possible eccentricity of the optical fibre, will be completely included within the area of the inclination. This form of inclination has, however, the disadvantage that only a section is left over as a face, which is arranged at rightangles to the middle axis of the connector pin. In principle, the connector pin has the form of a cylinder which has been cut off obliquely. Since the face of the connector simultaneously forms the contact surface for both of the opposing connector pins, this type of configuration is very disadvantageous. With the extremely small diameter of the connector pins, for example 2.5 mm, a very small contact surface remains between both the coupled connector pins. Just a slight slanting of the remaining contact surfaces can strongly influence the transmission loss.

A method of grinding connector end surfaces has been made known through JP-A-57/156159, with which, in order to form an inclination, a tool with a spherical grinding surface is led against the face, whereby the rotating axis of the tool runs eccentrically to the axis of the fibre. In this way the contact surface on the connector face can indeed be somewhat enlarged, since, for example, it runs slightly crescent shaped. A clean boundary between the inclination and the remaining contact surface is at the same time no longer ensured. Depending on the material and the quality of the tool, the smallest faults or burrs can occur which adversely effect the flatness of the contact surface and with that the quality of the plug-in connection. The grinding procedure becomes problematic especially if the connector pin also exhibits two different materials on the face, for example an outer ferrule of hard metal and a core of a flexible alloy.

SUMMARY OF THE INVENTION

It is therefore a purpose of the invention to create a connector of the type mentioned in the introduction, whose face forms an optimum limit-stop surface for the plug-in connection with undiminished high return loss. This task is, according to the invention, fulfilled with a connector which exhibits the characteristics of claim 1.

Owing to the fact that the inclination includes just the fibre end surface and the section of the face immediately surrounding it, an annular shaped, uninterrupted edge area remains around the optical fibre. This outer edge area possesses the same, if not better, limit-stop properties as a circular face without inclination. In any desired relative position of two opposed, coupled connector pins, the limit-stop is maintained and the total contacting surface area remains constant. Thus, for example, two connector pins with inclined fibres could also be rotated relative to one another for intentional influence of the loss, whereby rotation through 360 degrees is possible without difficulty. With known connectors this would be problematic since the total contacting surface changes constantly, and with that the risk of incorrect positioning or damage also increases.

Since the inclination is separated from the outer edge area by an annular indentation, inclined grinding can be better applied. The surface to be worked upon remains restricted to a minimum and any irregularities in the edge area of the grinding cannot influence the flatness of the edge area on the connector face.

If the connector pin comprises an outer ferrule of relatively hard material and a core of softer material, it is particularly advantageous if the edge area, which is not inclined, is formed by the face of the outer ferrule. In this way the hard material of the outer ferrule does not need to be further worked on in any way. The inclination lies only in the area of the softer, and therefore better to work on, core part.

Depending on the grinding tool employed, the inclination can run flat or cylindrically, or respectively ball-shaped with an inward curvature. Apart from that, the optical fibre can—as is known—be fixed parallel to the middle axis or inclined to the middle axis of the connector pin.

BRIEF DESCRIPTION OF THE DRAWINGS

Versions of the invention are depicted in the drawings and are subsequently more exactly described. Namely.

DESCRIPTION OF THE PREFERRED EMBODIMENTS

Figure 1:
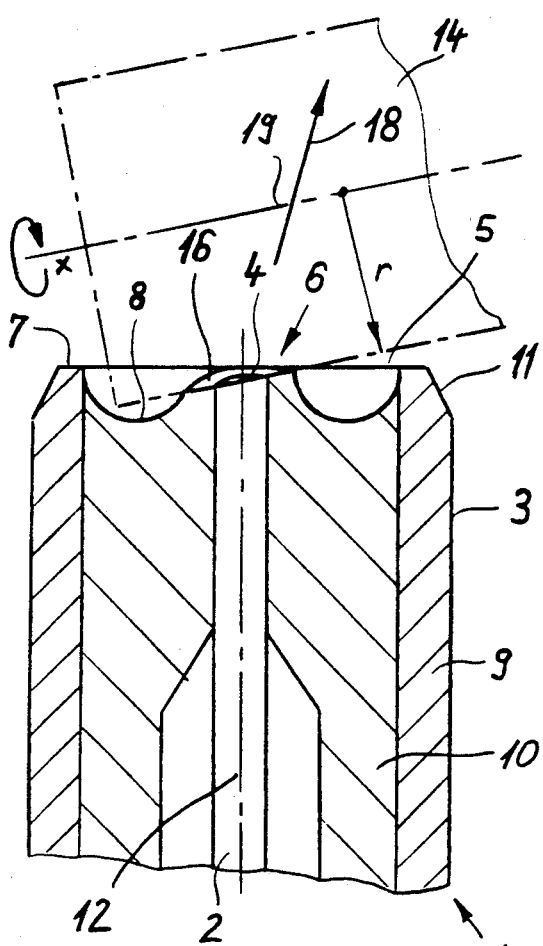
FIG. 1—a highly enlarged cross section through a connector pin according to the invention, with cylindrical grinding, FIG. 2—a view of the connector pin according to FIG. 1, turned through 90 degrees, FIG. 3—a plan view of a connector pin according to FIG. 2, FIG. 4—a cross section through a modified version of a connector pin according to the invention with a flat grinding, and FIG. 5—a cross section through a further version with spherical grinding.
Figure 2:
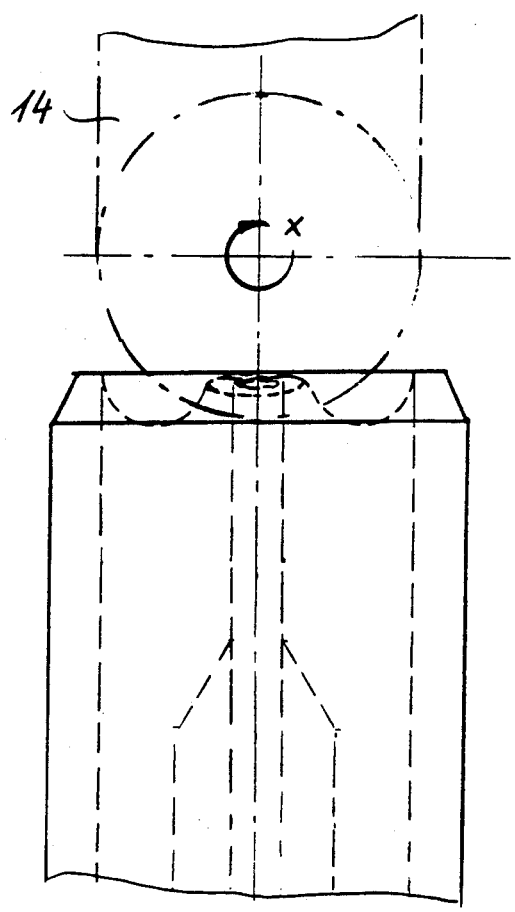
Figure 3:
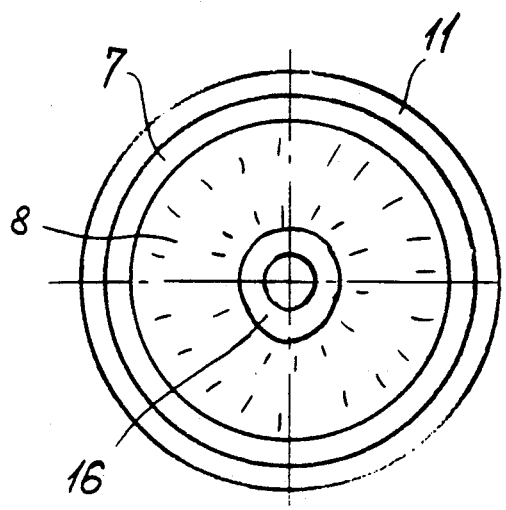

In FIGS. 1 to 3 a connector 1 according to the invention is depicted, whereby, in spite of the inclination of the fibre end surface 4, a surrounding edge area 7 remains which extends through 360 degrees. The connector pin 3 is constructed in two parts in a known way and has an outer ferrule 9 which, for example, can be made from hard metal or a ceramic material or hardened steel. The core 10 of the connector pin is made of a softer material, for example a non-ferrous alloy, and the optical fibre 2 can, after insertion into the optimum position, be fastened in a known way by stamping. The optical axis 12 of the optical fibre runs parallel to the middle axis of the connector pin 3. An annular indentation 8 is provided on the face 5 which, however, does not include the outer ferrule 9. The indentation can be previously cast into the core 10 or can be subsequently produced through turning. A section 16 remains around the fibre end surface 4 so that, even with the maximum permitted eccentricity of the optical fibre, the fibre end surface 4 is always surrounded by the material 10 of the core part. The diameter of the connector pin 3 lies within the range between 2 mm to 4 mm. A surrounding chamfer 11 facilitates the connection procedure.

The inclination of the fibre end surface 4 and the section 16 ensues in this version with a grinding disk 14, which is rotated about the grinding disk axis 19 in the direction of the arrow x. The cylindrical grinding disk possesses a radius r, so that the inclination runs cylindrically with an inward curvature. The angle between the grinding disk axis 19 and the optical axis 12 can be ascertained through calculation, so that the desired return loss can be achieved with consideration of all possible parameters. The inclination on the fibre end surface 4 causes a deflection of the light beam in the deflection axis 18, relative to the optical axis 12 of the optical fibre.

Figure 4:
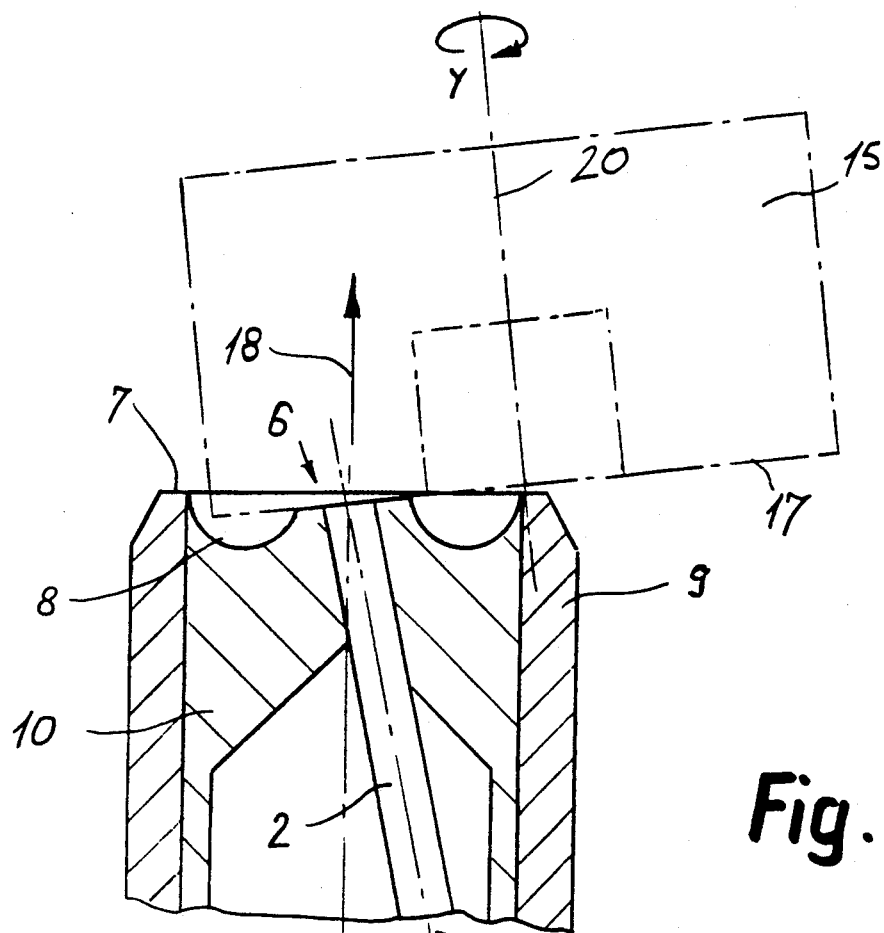

The hard outer ferrule 9 is completely untouched by the inclined grinding. The cylindrical curvature of the inclination can be ignored without further consequence, since the diameter of the optical fibre is extremely small. In FIG. 4, an alternative version is depicted in which the connector pin is, however, similarly constructed to the version according to FIGS. 1 to 3. The optical axis 12 of the optical fibre is, however, arranged to be inclined to the middle axis 13 of the connector pin. As opposed to the previously described version, the inclination does not, however, run with a curvature, but is flat. The flat inclination can be achieved through the use of a cup-wheel 15 which is rotated in the direction of the arrow y around the grinding disk axis 20. The grinding surface 17 on the cup-wheel thus produces the inclination. Here also, an edge area 7 remains around the inclination which extends through 360 degrees. Whatever relative position the optical axis 12 exhibits depends considerably on the purpose for which the connector will be used.

The inclination of the fibre end surface 4 can be selected in such a way that the light beam exits parallel to the connector axis.

With this arrangement of the optical fibre, the exiting light can be immediately fed into a lens system.

Figure 5:
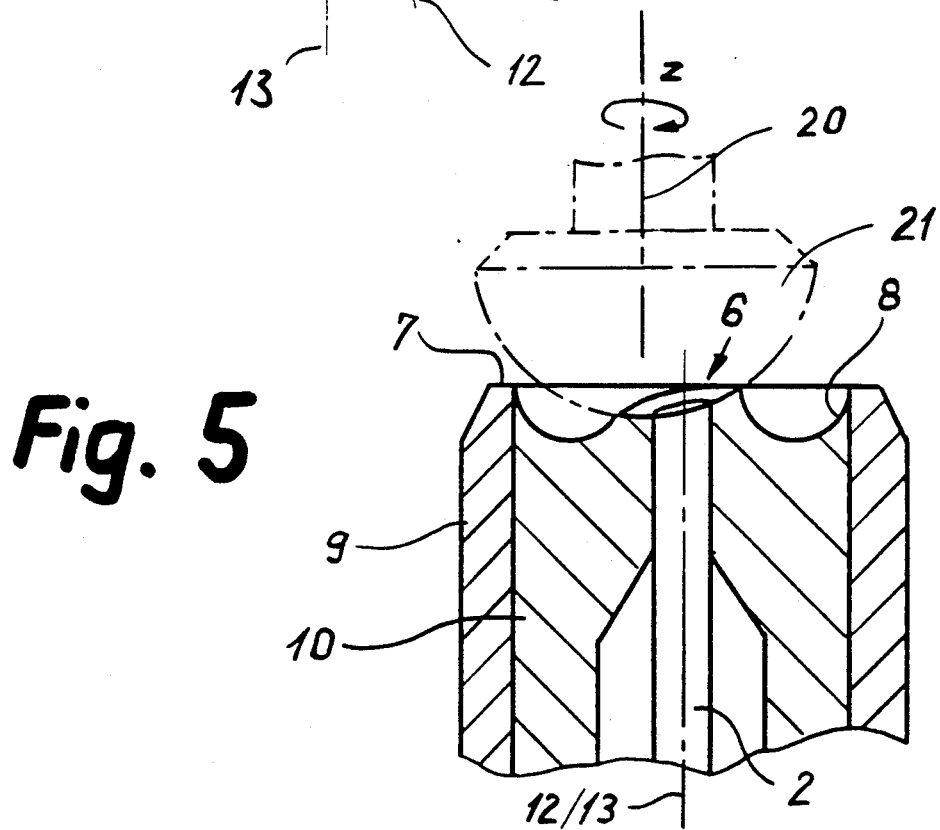

With the version according to FIG. 5, the optical axis 12 of the fibres 2 and the connector axis 13 are once again parallel. The inclination 6 is, however, formed ball-shaped and is produced by a ball-shaped grinding head 21 that is rotated around the axis 20 in the direction of the arrow z. The axis 20 is arranged to be offset in relation to the axes 12/13. The concave curvature on the fibre end surface can in practice also be ignored. Finally, not depicted here but likewise conceivable would be the application of an inclination by means of a grinding disk whose rotational axis runs at right angles to the connector axis 13, but is, however, offset in relation to it. The result would likewise be a cylindrical inclination, but with a displaced centre.

I claim:

1. An optical connector comprising an optical fiber and a pin surrounding and supporting the fiber, the pin and the fiber having respective longitudinal axes and respective end surfaces, the improvement wherein the end surface of the connector pin comprises an inner portion inclined relative both to the axis of the pin and to the axis of the fiber, said inner portion containing the entire end surface of the fiber and being flush therewith, and a peripheral portion completely surrounding said inner portion, the peripheral portion being orthogonal to the pin axis, said inner portion being completely separated from said peripheral portion by an annular indentation.

2. A connector according to claim 1, wherein the connector pin comprises an outer ferrule (9) of a relatively hard material and a core (1) of a softer material supporting the optical fiber, and that said peripheral portion (7) comprises the end face of the outer ferrule (9).

3. A connector according to claim 1 or 2, wherein the inclined surface is planar.

4. A connector according to claim 1 or 2, wherein the inclined surface is cylindrical, and concave.

5. A connector according to claim 1 or 2, wherein the inclined surface is substantially spherical, and concave.

6. A connector according to claim 2, wherein the ferrule is made from a sintered metallic material.

7. A connector according to claim 2, wherein the ferrule is made from a ceramic material.

8. A connector according to claim 1, wherein the optical fiber terminates short of the end of the connector, whereby said inclined surface is below the level of said peripheral end face, and the end face acts as a limit stop to prevent face-to-face contact of mating fibers.

* * * * *